US012586348B2

(12) United States Patent
Cai et al.

(10) Patent No.: US 12,586,348 B2
(45) Date of Patent: Mar. 24, 2026

(54) FEATURE FUSION FOR MULTI-MODAL MACHINE LEARNING ANALYSIS

(71) Applicant: INTEL CORPORATION, Santa Clara, CA (US)

(72) Inventors: Dongqi Cassie Cai, Beijing (CN); Anbang Yao, Beijing (CN); Ping Hu, Beijing (CN); Shandong Wang, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1451 days.

(21) Appl. No.: 16/645,425

(22) PCT Filed: Oct. 9, 2017

(86) PCT No.: PCT/CN2017/105311
§ 371 (c)(1),
(2) Date: Mar. 6, 2020

(87) PCT Pub. No.: WO2019/071370
PCT Pub. Date: Apr. 18, 2019

(65) Prior Publication Data
US 2020/0279156 A1    Sep. 3, 2020

(51) Int. Cl.
*G06V 10/764* (2022.01)
*G06N 3/04* (2023.01)
(Continued)

(52) U.S. Cl.
CPC ............. *G06V 10/764* (2022.01); *G06N 3/04* (2013.01); *G06N 3/08* (2013.01); *G06V 10/82* (2022.01); *G06V 40/174* (2022.01); *G06N 3/084* (2013.01)

(58) Field of Classification Search
None
See application file for complete search history.

(56) References Cited

U.S. PATENT DOCUMENTS

| 10,867,246 B1 * | 12/2020 | Nguyen | G06N 20/00 |
| 11,335,438 B1 * | 5/2022 | DePristo | G06N 3/04 |
| 2019/0034814 A1 * | 1/2019 | Amer | G06N 20/00 |

OTHER PUBLICATIONS

Zhao et al., "Heterogeneous Feature Selection With Multi-Modal Deep Neural Networks and Sparse Group Lasso", IEEE Transactions on Multimedia, vol. 17, No. 11, Nov. 2015, (Year: 2015).*

(Continued)

*Primary Examiner* — Shahid K Khan
*Assistant Examiner* — Beatriz Ramirez Bravo
(74) *Attorney, Agent, or Firm* — Hanley, Flight & Zimmerman, LLC

(57) ABSTRACT

A system to perform multi-modal analysis has at least three distinct characteristics: an early abstraction layer for each data modality integrating homogeneous feature cues coming from different deep learning architectures for that data modality, a late abstraction layer for further integrating heterogeneous features extracted from different models or data modalities and output from the early abstraction layer, and a propagation-down strategy for joint network training in an end-to-end manner. The system is thus able to consider correlations among homogeneous features and correlations among heterogenous features at different levels of abstraction. The system further extracts and fuses discriminative information contained in these models and modalities for high performance emotion recognition.

24 Claims, 10 Drawing Sheets

100

(51) Int. Cl.

| | |
|---|---|
| *G06N 3/08* | (2023.01) |
| *G06V 10/82* | (2022.01) |
| *G06V 40/16* | (2022.01) |
| G06N 3/084 | (2023.01) |

(56) References Cited

OTHER PUBLICATIONS

Zhang et al., "Multimodal Deep Convolutional Neural Network for Audi-Visual Emotion Recognition", ICMR '16, Jun. 6-9, 2016 (Year: 2016).*

Zhang et al. "Learning Affective Features with Hybrid Deep Model for Audio-Visual Emotion Recognition", IEEE, (Jun. 23, 2017) (Year: 2017).*

Kaya et al., "Video-based emotion recognition in the wild using deep transfer learning and score fusion", Elsevier, (Feb. 2017)—disclosing multimodal recognition of affective states using CNN based features obtained via transfer learning. (Year: 2017).*

Szegedy et al., "Inception-v4, Inception-ResNet and the Impact of Residual Connections on Learning" (2017) (Year: 2017).*

Ranganathan et al., "Multimodal Emotion Recognition using Deep Learning Architectures" (2016) (Year: 2016).*

"Deep Learning for Robust Feature Generation in Audiovisual Emotion Recognition",(2013). (Year: 2013).*

* cited by examiner

500

600

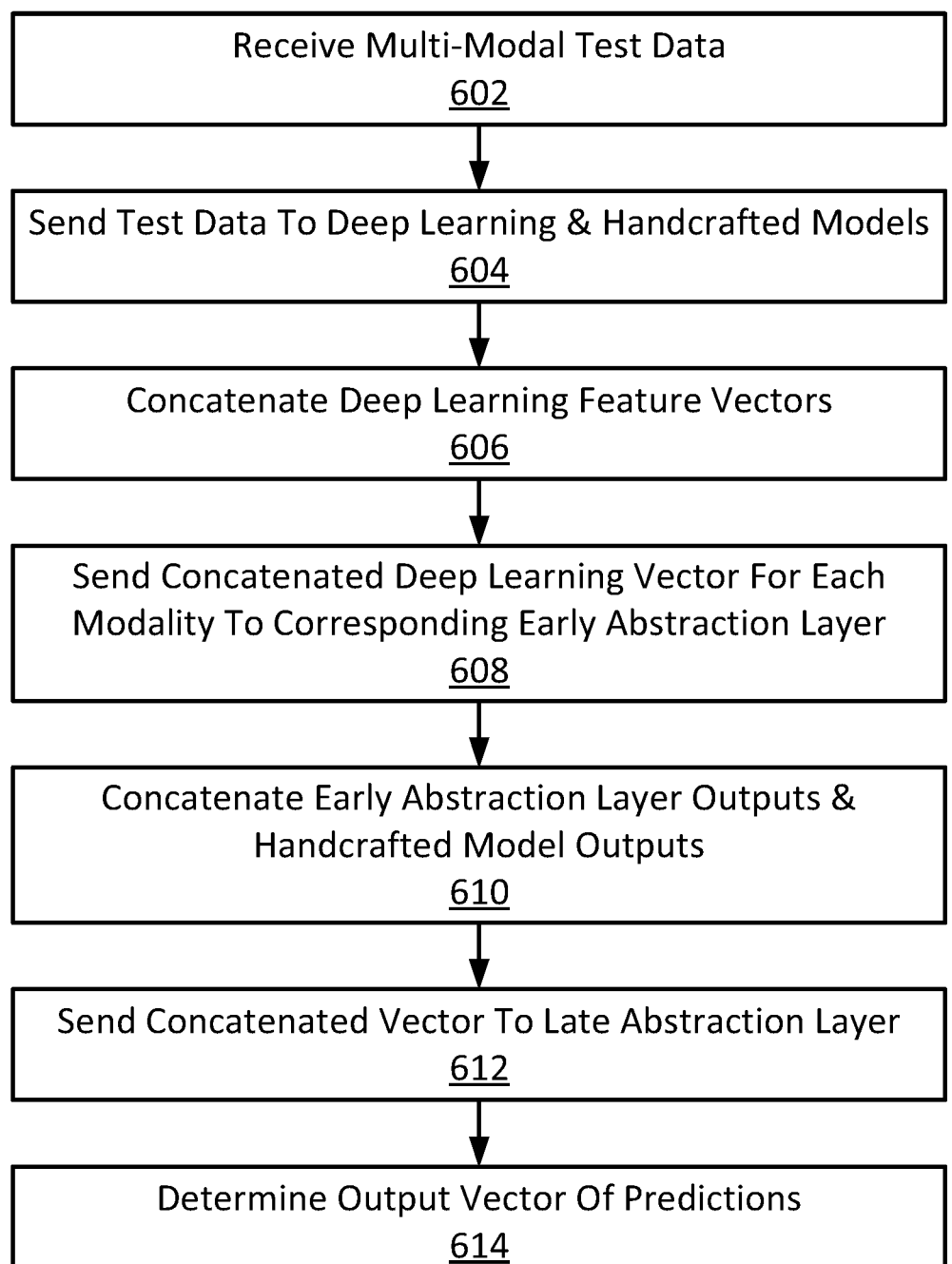

Receive Multi-Modal Test Data
602

Send Test Data To Deep Learning & Handcrafted Models
604

Concatenate Deep Learning Feature Vectors
606

Send Concatenated Deep Learning Vector For Each Modality To Corresponding Early Abstraction Layer
608

Concatenate Early Abstraction Layer Outputs & Handcrafted Model Outputs
610

Send Concatenated Vector To Late Abstraction Layer
612

Determine Output Vector Of Predictions
614

FEATURE FUSION FOR MULTI-MODAL MACHINE LEARNING ANALYSIS

FIELD

The present disclosure relates to modality fusion architectures for machine learning.

BACKGROUND

Machine learning is a rapidly expanding field with an increasing number of applications. One such application is image/video/audio analysis for emotion recognition. In fact, there exist international competitions pitting emotion recognition systems against each other, ranking competitors by system accuracy. Systems are typically trained via sample data and then used to analyze test data. Machine learning systems include traditional machine learning, such as support vector machines (SVMs), and deep learning, such as deep neural networks (DNN), deep belief networks (DBN), convolutional neural networks (CNN), recurrent neural networks (RNNs), etc., sometimes working together.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 6 illustrates a flowchart of operations consistent with one embodiment of the present disclosure;

Although the following Detailed Description will proceed with reference being made to illustrative embodiments, many alternatives, modifications, and variations thereof will be apparent to those skilled in the art.

DETAILED DESCRIPTION

The present disclosure provides systems, logic and methodologies to identify an emotion expressed in a video using machine learning. The machine learning system may include multi-modal analysis having at least three distinct characteristics: an early abstraction layer for integrating homogeneous feature cues coming from different deep learning architectures for one data modality, a late abstraction layer for further integrating heterogeneous features extracted from different models or data modalities and output from the early abstraction layer, and a propagation-down strategy for joint network training in an end-to-end manner. The system is thus able to consider correlations among homogeneous features and correlations among heterogenous (e.g., from different data modalities) features at different levels of abstraction. The system further extracts and fuses discriminative information contained in these models and modalities for high performance emotion recognition.

Figure 1:
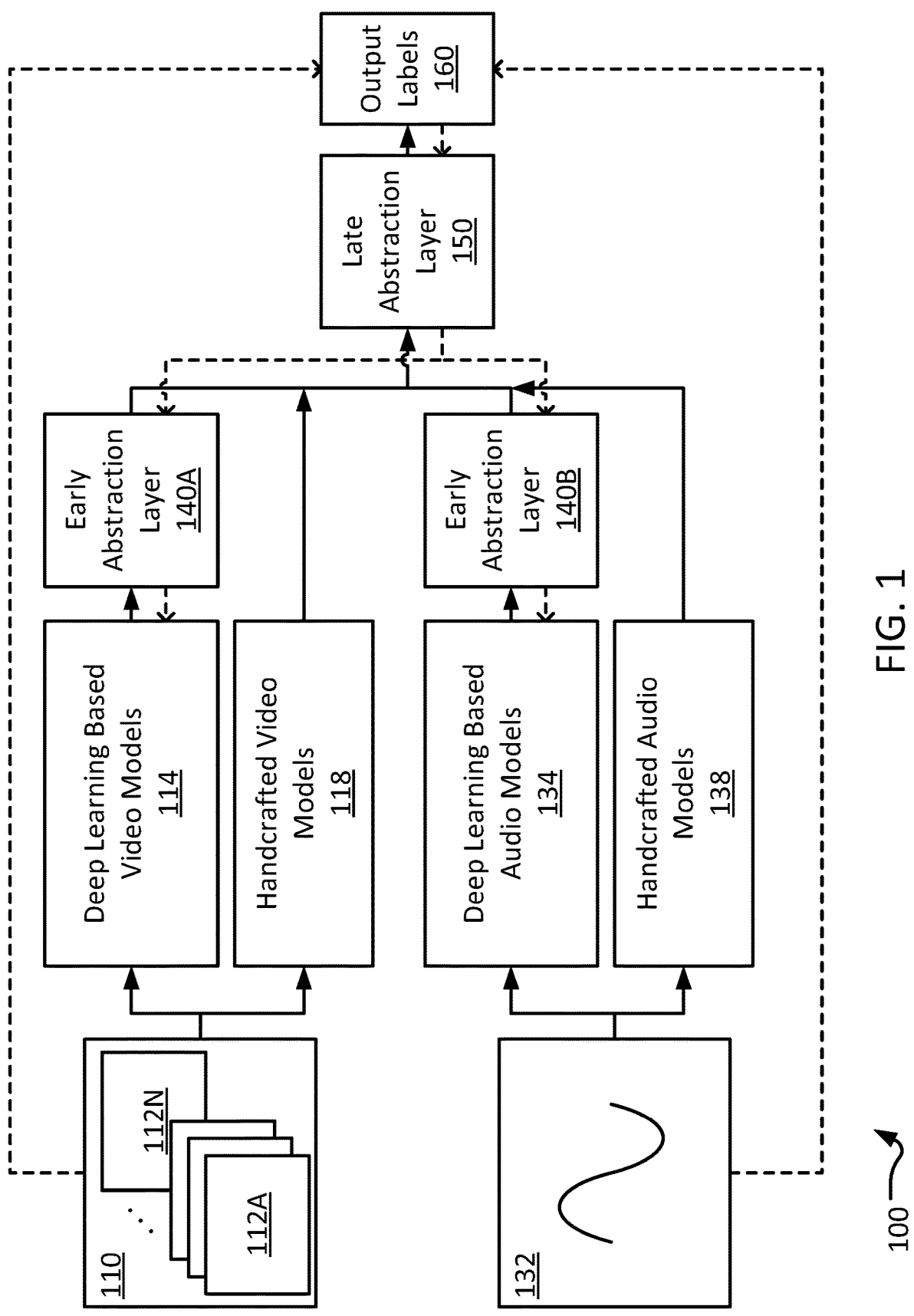
FIG. 1 illustrates an example multi-modal feature extraction system consistent with various embodiments of the present disclosure.

FIG. 1 illustrates an example multi-modal feature extraction system 100 consistent with various embodiments of the present disclosure. System 100 is generally configured to receive inputs and determine a probability vector based on analysis of the inputs using several models and integrating analysis on multiple input modalities. System 100 generally receives video input 110 and audio input 132, trains itself based on sample data, extracts features from the inputs using both deep learning models (e.g., deep learning based video models 114 and deep learning based audio models 134) and "handcrafted" models (e.g., handcrafted video models 118 and handcrafted audio models 138). The models are generally configured to output feature vectors (not shown in FIG. 1) based on predictions of each model.

The feature vectors from the deep learning based models (e.g., 114 and 134) are concatenated or combined before being forwarded (e.g., sent, transmitted, etc.) to an early abstraction layer, such as 140A or 140B. For example, the feature vectors of deep learning based video models 114 are concatenated before being forwarded to early abstraction layer 140A, while the feature vectors of deep learning based audio models 134 are concatenated before being forwarded to early abstraction layer 140B. Each early abstraction layer 140A-140B may include a single fully-connected layer. The feature vectors of the handcrafted models are concatenated with the output of the early abstraction layers, and the concatenated vectors are submitted to a late abstraction layer 150. This concatenation is depicted via solid arrows in FIG. 1, and shown in more detail in FIG. 3, as described below. The late abstraction layer 150 then produces an output label vector 160, representing the prediction of system 100.

In some embodiments, system 100 is configured to receive a video clip input (including a plurality of frames along with audio) and determine an emotion expressed by a subject in the video clip (out of a pool of R possible emotions, e.g., if the possible emotions are angry, sad, happy, disgust, fear, surprise, and neutral, R=7). The output label vector 160 may thus be a 1×R vector, with each entry representing a weighted or normalized probability of a subject of the video clip expressing the corresponding emotion. For example, if the second row of the vector corresponded to "sad" and had a value of 0.5, this may represent system 100 predicting a 50% chance of the subject of the video expressing sadness in the video clip, etc. Depending upon how they are weighted, values of the output label vector 160 may range from, e.g., −1 to 1, 0 to 1, 0 to 100, etc.

In general, the deep learning based models (e.g., 114 and 134) include deep neural networks that are trained by adjusting parameters based on sample data before being used for prediction. Deep learning based models may differ depending upon which data modality they are used for. For example, the deep learning based video models 114 may include convolutional neural networks (CNNs), etc., while the deep learning based audio models 134 may include recurrent neural networks (RNNs). Handcrafted models (e.g., 118 and 138) may each include determined features and a model, such as a support vector machine (SVM) model. The determined features of the handcrafted models may differ depending upon data modality. For example, handcrafted video models 118 may include determining improved Dense Trajectory (iDT) features, while handcrafted audio models 138 may include determining statistical features such as mel-frequency cepstral coefficients (MFCC), harmonic features, etc. System 100 is generally configured to train the handcrafted models based on the determined features of the sample data.

System 100 is generally configured to train deep learning models 114 and 134 using sample data. Training is generally implemented in two phases, a feed-forward phase and a back-propagation phase. In general, in the feed forward phase, sample data is input, the models determine feature vectors, the feature vectors are concatenated and passed through abstraction layers, and an output vector is determined. Generally, the back-propagation phase includes sending information to the layers of system 100, where the layers receiving the back-propagated information update one or more parameters based on the information. The back-propagated information may include a gradient of a cost function, where the cost function is determined based on a plurality of loss functions. One loss function may be determined for each set of sample data based on a difference between the output label vector 160 and the known values of sample data (e.g., 110 and 132). The loss function may be, for example, a softmax function, wherein an error vector containing the differences between the elements of the output vector and the elements of the known sample data vector is normalized such that the values corresponding to each element range from [0, 1] and add up to 1. Back-propagation is depicted using dashed lines in FIG. 1.

Handcrafted models 118 and 138 may not receive back-propagated information. This is because the handcrafted models 118 and 138 cannot be trained based on error functions. Instead, the handcrafted models 118 and 138 may include models that are trained independently of deep learning models 114 and 134 based on, e.g., ground-truth values of sample data. For example, handcrafted video model 118 may be include an SVM trained based on iDT features of sample video data 110. The sample video data may be divided into training and validation sets, as known to one skilled in the art. In some embodiments, handcrafted models 118 and 138 may be pre-trained models (e.g., customer off-the-shelf (COTS) models with known parameters). However, the deep learning models 114 and 134 typically include one or more neural networks. These neural networks may have a plurality of neurons, where each neuron has a weight parameter and a bias parameter. These parameters are adjusted based on the back-propagated information, e.g., cost function gradient.

System 100 is generally configured to iterate training. In some embodiments, system 100 may iterate the training process (e.g., begin an additional feed-forward phase) with the same sample data set until the weight parameters converge, as known to those skilled in the art. In other embodiments, after the back-propagation phase, system 100 may be configured to repeat the training process with an additional sample data set. After a feed-forward phase, system 100 may compares the output label vector 160 to the known data. If the output 160 is within an accuracy threshold, training may be completed. The threshold may comprise, for example, a determination of whether the highest confidence output value was the known correct value, or if the known correct value was at over a 95% confidence rating, etc.

System 100 may record various states (e.g., the values of each parameter) and their corresponding accuracies. This way, if system 100 uses all of its sample data sets without meeting the accuracy threshold, the system may determine which set of parameters resulted in the highest accuracy. Alternatively, system 100 may simply use the current or most recent parameter set.

Figure 2:
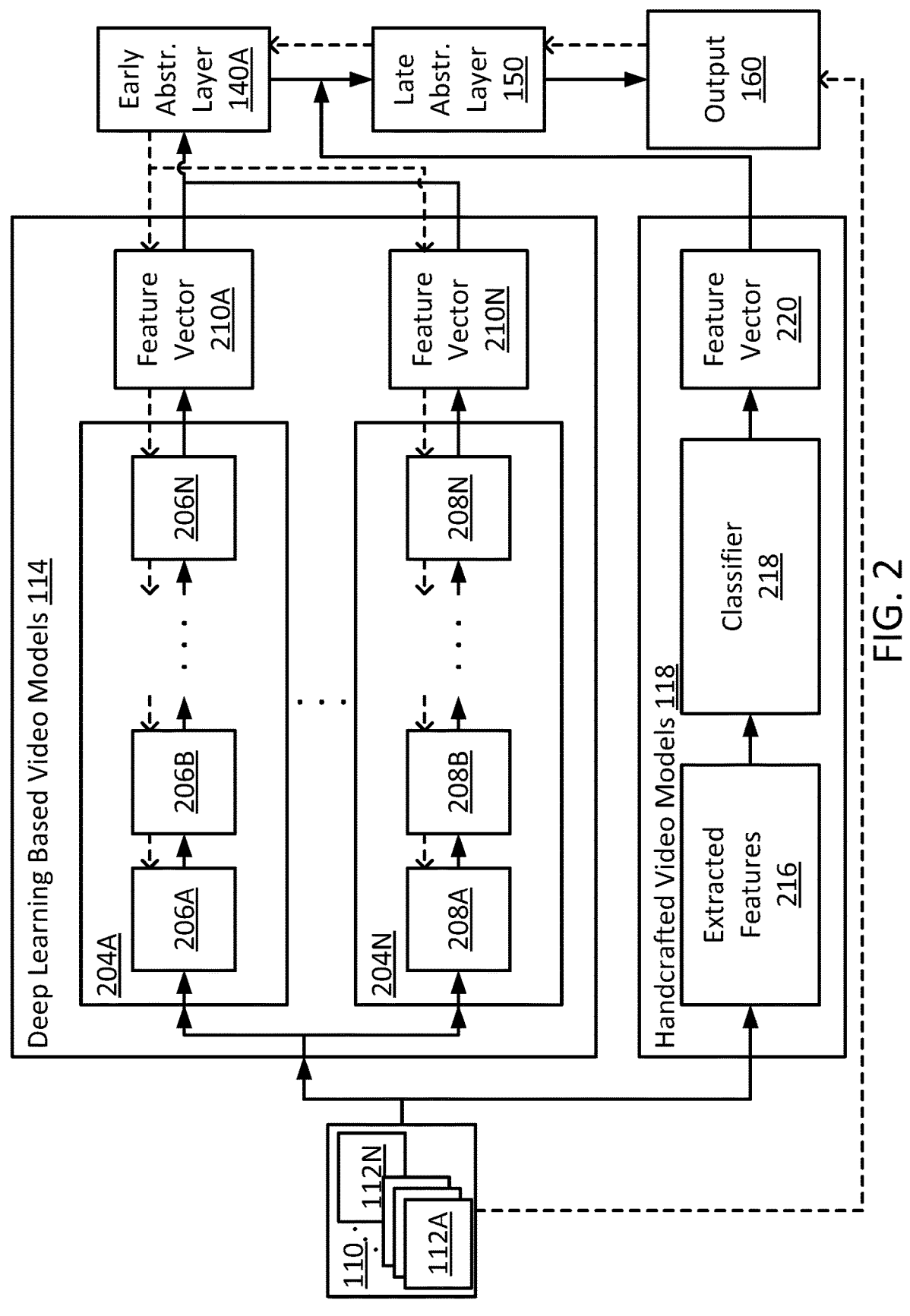
FIG. 2 illustrates an example multi-modal feature extraction system consistent with several embodiments of the present disclosure.

FIG. 2 illustrates an example multi-modal feature extraction system 100 consistent with several embodiments of the present disclosure. In particular, FIG. 2 illustrates a video analysis component of system 100. For example, deep learning based video models 114 are shown including models 204A . . . 204N, with each model having multiple layers (e.g., model 204A has layers 206A, 206B . . . 206N, while model 204N has layers 208A, 208B, . . . 208N, etc.). Also shown are feature vectors 210A . . . 210N. Additionally, in at least one embodiment, extracted features 216 of handcrafted video models 118 may comprise improved dense trajectory features while classifier 218 may comprise a support vector machine (SVM) model determined and trained based on extracted features 216, generally configured to produce a feature vector 220.

As can be seen in FIG. 2, feature vectors 210A-210N of deep learning based video models 114 are concatenated (depicted in FIG. 2 using solid line intersections) and forwarded to early abstraction layer 140A, while feature vector 220 of handcrafted video models 118 is concatenated with output of early abstraction layer 140A before the result is forwarded to late abstraction layer 150. As similarly depicted in FIG. 1, late abstraction layer 150 outputs a result to output label vector 160 (note that results and vectors from audio models 134 and 138 are not depicted in FIG. 2).

Models 204A-204N may be deep learning models, e.g., CNNs, RNNs, etc. Models 204A-204N may all be the same type of model, or some or all of the models may be different from one another; for example, in some embodiments, all of models 204A-204N are CNNs. In some embodiments, some models of deep learning based audio models 134 (not shown in FIG. 2) may be RNNs, while others may be long short-term memory (LSTM) networks.

As shown in FIG. 2, error information based on known values from data set 110 are back-propagated (depicted again as dashed lines) through late abstraction layer 150, early abstraction layer 140A, and through deep learning based video models 114. Each layer of models 204A-204N receives the back-propagated information and has parameters adjusted accordingly (e.g., bias and weight are modified).

Figure 3:
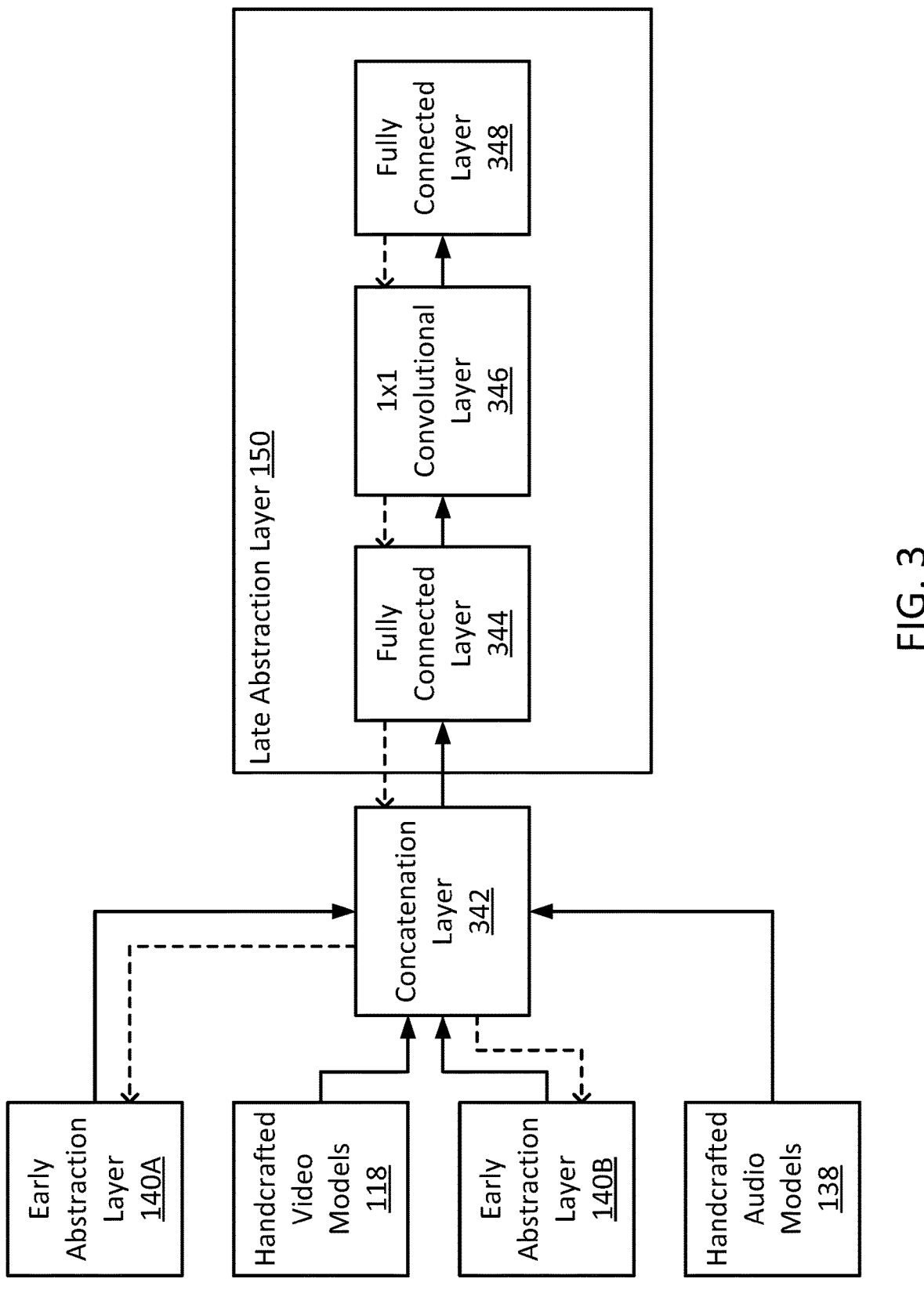
FIG. 3 illustrates an example multi-modal feature extraction system consistent with at least one embodiment of the present disclosure.

FIG. 3 illustrates an example multi-modal feature extraction system 100 consistent with several embodiments of the present disclosure. In particular, FIG. 3 includes detail on a concatenation layer 342 and the late abstraction layer 150, including a first fully connected layer 344, a 1×1 convolutional layer 346, and a second fully connected layer 348. As shown in FIG. 3, outputs of the early abstraction layers 140A and 140B are concatenated with each other and the outputs of the handcrafted models 118 and 138 in concatenation layer 342. For example, if each of the outputs is a 1×7 vector, then output of concatenation layer 342 would be a 1×28 vector. Concatenation of each of these vectors prior to sending the result to late abstraction layer 150 enables system 100 to "fuse" complementary information, identifying correlations amongst heterogeneous features of different data modalities (such as correlations between video features and audio features). Fully connected layers (e.g., 344) are used to map learned feature vectors (e.g. concatenation layer 342) into any specified dimensional outputs.

Back-propagated information is depicted in FIG. 3 using dashed lines. The back-propagated information is used to modify bias and/or weight parameters of the abstraction layers, including the fully connected layers 344 and 348, the 1×1 convolution layer 346, and the fully connected layers (not shown in FIG. 3) of early abstraction layers 140A and 140B.

Figure 4:
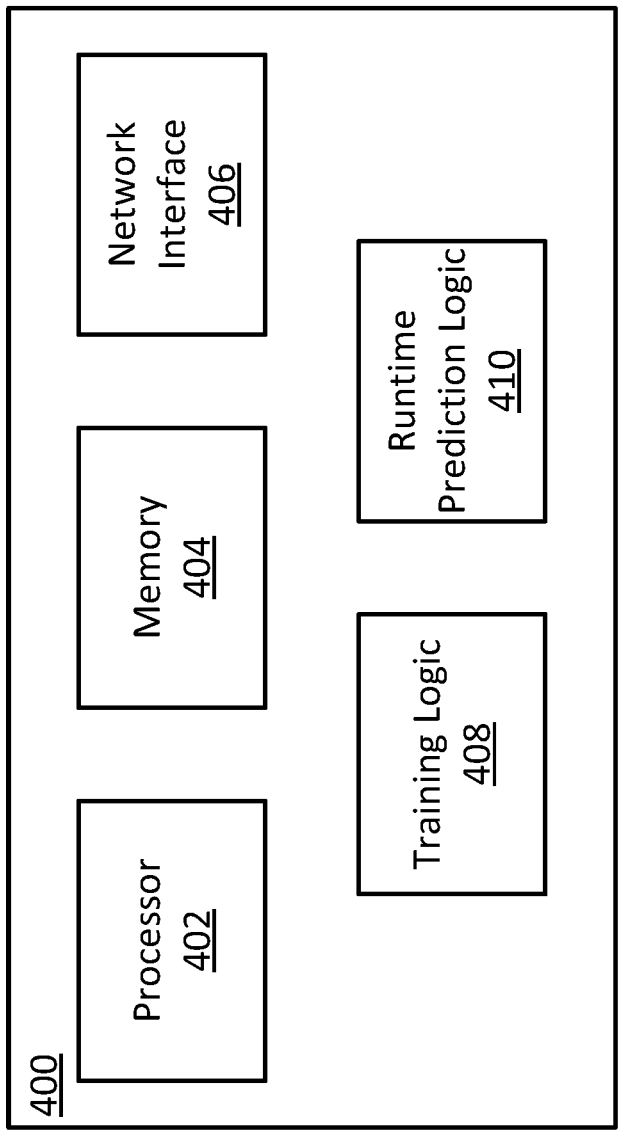
FIG. 4 illustrates an example device consistent with several embodiments of the present disclosure.

FIG. 4 illustrates an example device 400 consistent with several embodiments of the present disclosure. Device 400 generally includes a processor 402, memory circuitry 404, a network interface 406, training logic 408 and runtime prediction logic 410. In general, device 400 is configured to receive an input (via, e.g., interface 406) including a plurality of sample data and test data, train a plurality of models using the sample data, and determine (via the trained models) an output based on the test data. The received data may be stored on, e.g., memory 404. Processor 402 is generally configured to execute instructions stored on, for example, memory 404. Training logic 408 is generally configured to train models such as, for example, deep learning based models 114 and 134 as well as handcrafted models 118 and 138 using at least the sample data received by device 400. Runtime prediction logic 410 is generally configured to determine an output based on the trained models and test data received by device 400.

Training logic 408 is generally configured to perform or cause training of handcrafted models 118 and 138. For example, training logic 408 may determine extracted features 216 based on sample video data (e.g., 110) to train classifier 218 to output a feature vector 220. This training may include dividing the sample data 110 into training data and validation data, as understood by one skilled in the art. In some embodiments, sample data 110 may be pre-divided into training and validation data before it is received by system 100. In some embodiments, training logic 408 may train handcrafted models 118 and 138 prior to initiating training of deep learning models 114 and 134, e.g., at system startup, upon receiving sample data, etc. In some embodiments, training logic 408 is configured to train handcrafted models 118 and 138 during or alongside training of deep learning models 114 and 134.

Training logic 408 is further configured to perform or cause feed-forward training and back-propagation parameter revision of deep learning models 114 and 134. For each data modality, the feed-forward phase may include, for example, passing sample data through deep learning models (e.g., 204A-204N) to produce feature vectors (e.g., 210A-210N), concatenating the feature vectors (e.g., 210A-210N), and passing the concatenated vectors to early an abstraction layer (e.g., 140A). Training logic 408 may further concatenate the output of each early abstraction layer (e.g., 140A, 140B, etc.) and each feature vector (e.g., 220) output from handcrafted model 118, passing the concatenated output to late abstraction layer 150. Training logic 408 may additionally determine an output feature vector 160 based on the late abstraction layer 150.

After a feed-forward phase, training logic 408 is further generally configured to determine whether back-propagation of error information is necessary, and further to perform the back-propagation of error information if it is determined to be necessary. For example, back-propagation may involve comparing known sample data (e.g., an emotion corresponding to sample data 110) to output 160 to determine an error based on a loss function. The loss function may include, for example, a softmax function. Training logic 408 may compare the error to a threshold value. If the error is outside the threshold (e.g., an emotion prediction was incorrect/not confident enough), training logic 408 may initiate back-propagation. Based on the loss function, training logic 408 may adjust parameters of deep learning models (e.g., weight and bias parameters included in layers 206-206N of 204A, layers 208A-208N of model 204N, etc.) for each modality, as well as parameters of the early abstraction layers 140A-140B and the late abstraction layer 150.

Runtime prediction logic 410 is generally configured to determine an output 160 using models 114, 118, 134 and 138 based on test data (e.g., received via interface 406). Runtime prediction logic 410 may initiate operations upon receipt of data, upon prompting (by, e.g., a user via a user interface in device 400 (not shown in FIG. 4), etc.), based upon a timer, etc. In some embodiments, the test data may comprise a video clip. Runtime prediction logic 410 may separate the video clip into independent video frames (e.g., 112A-112N of FIG. 1) and an audio signal (e.g., 132). Runtime prediction logic 410 may then input video data (e.g., 110) into the trained deep learning based models (e.g., 114 and 134) and the trained handcrafted video models 118. In some embodiments, runtime prediction logic may receive correct or known results associated with the test data, and may adjust parameters of the deep learning models and abstraction layers similarly to training logic 408 to further train models 114 and 134 and abstraction layers 140A-B & 150.

Figure 5:
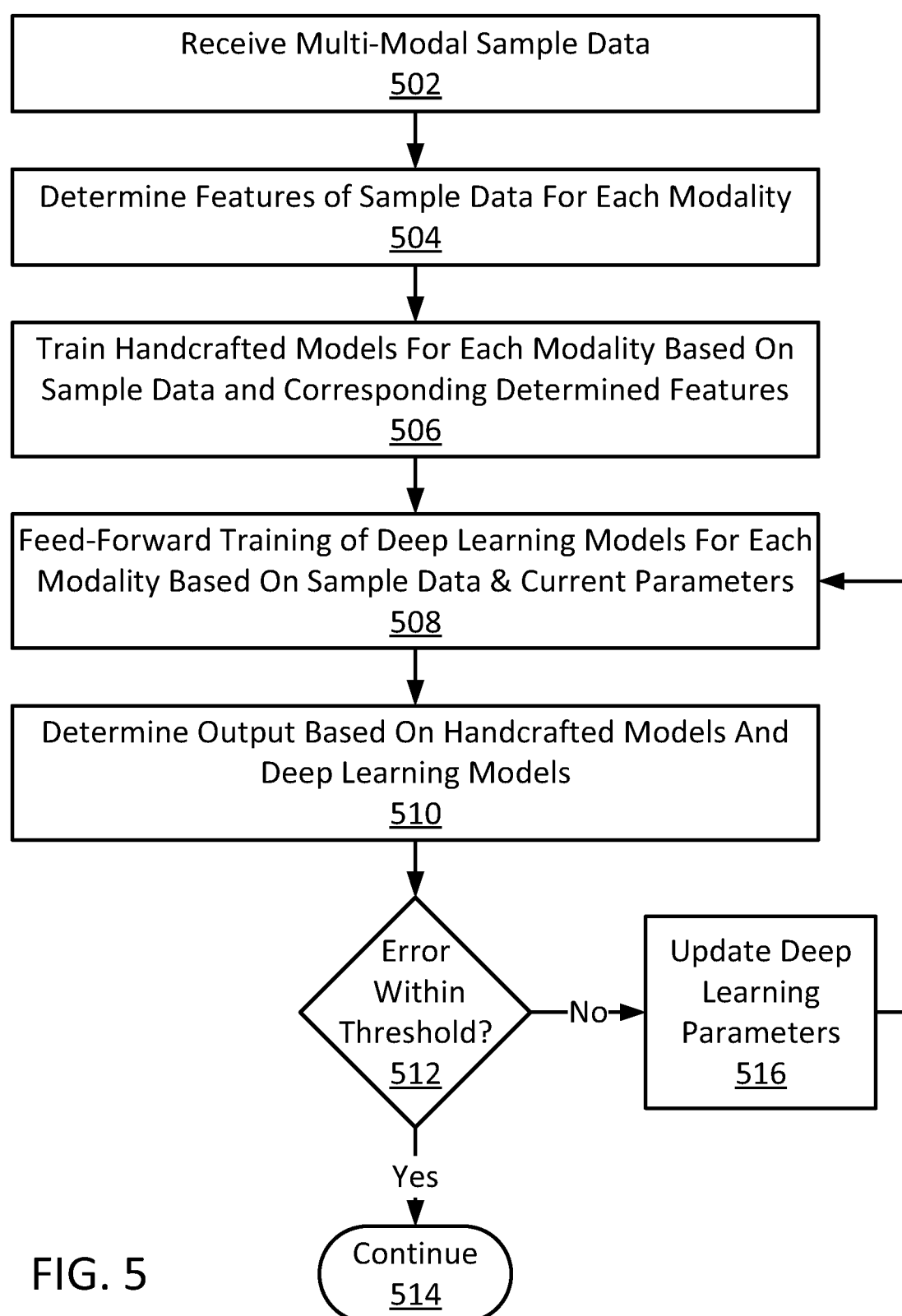
FIG. 5 illustrates a flowchart of operations consistent with one embodiment of the present disclosure.

FIG. 5 illustrates a flowchart 500 of operations consistent with one embodiment of the present disclosure. The operations of flowchart 500 may be performed by, for example, training logic 408 of device 400. Operations include receiving multi-modal sample data 502. This sample data may include, for example, audiovisual data (e.g., one or more video clips). Operations also include determining features of the sample data for each modality 504. This may include, for example, determining statistical features of an audio dataset, determining improved dense trajectory features of a video dataset, etc. Operations further include training handcrafted models for each modality based on sample data and corresponding determined features 506. This may include, for example, training a SVM (or other machine learning classifier) for each data modality. Operations also include feed-forward training of deep learning models for each modality based on the sample data & current parameters 508. At first, the current parameters may be initialized using any of a plurality of different strategies (e.g., Xavier, Gaussian, Linear, etc.). Operations further include determining an output based on the handcrafted models and deep learning models 510. This may include, for example, concatenating feature vectors output from the deep learning models into early abstraction layers (1 early abstraction layer for each modality), and then concatenating the early abstraction layer outputs with the handcrafted model outputs prior to forwarding the concatenated vector to a late abstraction layer.

Operations also include determining an error of the output, and comparing it to a threshold 512. The error may be determined via known values (e.g., included with the sample data) compared to the output determined at 510 using a loss function, such as a softmax function. If the error is within the threshold (e.g., 512 "Yes"), operations include continuing operation 514. If the error is outside the threshold (e.g., 512 "No"), operations include updating the deep learning parameters 516. This may include determining a gradient of the loss function and adjusting parameters of the deep learning models, early abstraction layers, and late abstraction layer based on the gradients of the cost function. Operations may further include repeating feed-forward training of the deep learning models based on the sample data and the current (i.e., updated) parameters 508.

FIG. 6 illustrates a flowchart 600 of operations consistent with one embodiment of the present disclosure. The operations of flowchart 600 may be performed by, for example, runtime prediction logic 410 of device 400. Operations include receiving multi-modal test data 602. Similarly to 502 of FIG. 5, this test data may include, for example, audiovisual data (e.g., one or more video clips). Operations also include sending the test data to deep learning and handcrafted models 604. These models may include models trained via training logic 408, as described in FIG. 5, to output feature vectors. Operations also include concatenating deep learning feature vectors 606. Operations further include sending or forwarding the concatenated deep learning vector of each modality to a corresponding early abstraction layer 608. Operations additionally include concatenating each of the early abstraction layer output vectors as well as the handcrafted model outputs 610. For example, this may include concatenating output vectors from early abstraction layers 140A-140B and handcrafted models 118 and 138 from FIG. 1 into a single vector. Operations also include sending this concatenated vector to a late abstraction layer 612. Operations further include determining an output vector of predictions 614. This may include a weighted prediction value corresponding to each of a plurality of options (e.g., emotions expressed in a sample video clip).

While the embodiments described herein generally refer to two data modalities, this is meant as exemplary and non-limiting. Additional data modalities can be added, along with their own deep learning models, handcrafted models, and early abstraction layers. The exact nature of the deep learning models and handcrafted models may vary depending upon the data modality. For example, as described above, RNNs work well for audio analysis, while CNNs are preferable for video. Other deep learning models may include, for example, long short-term memory (LSTM) networks or HoloNets.

HoloNets are described in PCT/CN2017/071950, filed on Jan. 20, 2017, which is hereby incorporated by reference in its entirety. As used herein, "HoloNet" refers to the CNN architecture depicted in FIG. 7-FIG. 10 and associated discussion.

Figure 7:
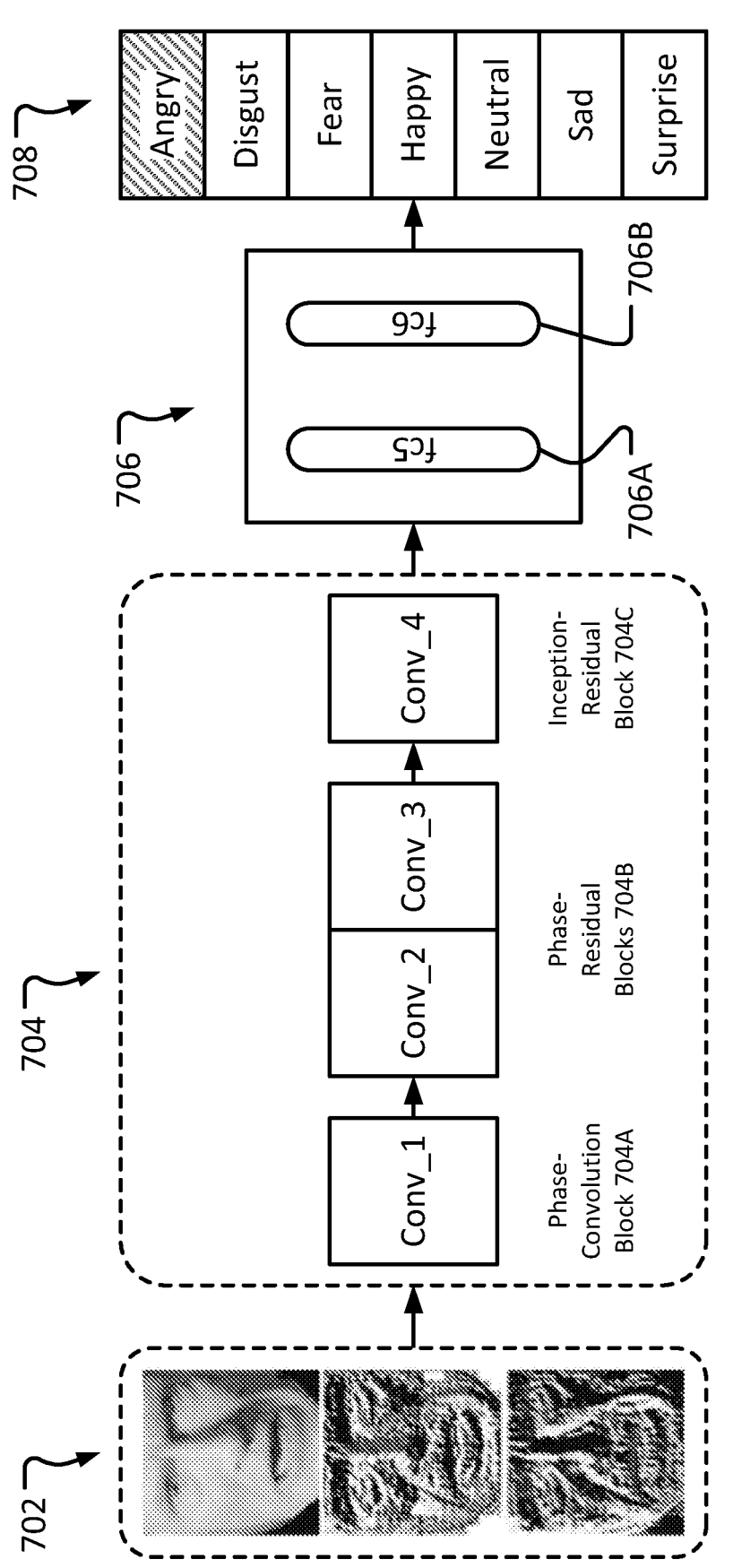
FIG. 7 illustrates a block diagram of an example HoloNet CNN that enables dynamic emotion recognition in unconstrained scenarios consistent with several embodiments described herein.

FIG. 7 illustrates a block diagram of an example HoloNet CNN 700 that enables dynamic emotion recognition in unconstrained scenarios. The CNN 700 includes a three-channel input 702, core layers 704, fully connected layers 706, and output labels 708. While a particular CNN structure is described herein, may different combinations of the proposed building blocks can generate different CNN architectures for meeting application requirements.

The three-channel input may be obtained at block 702 via a plurality of pre-processing steps. First, face localization/detection may be performed in a first frame of a video sequence. Face localization is performed on an arbitrary, unconstrained image to determine the location of the face that initially appears in a video. Determining the precise placement of the face determines the location of relevant information for processing by the CNN. Face localization/detection is followed by facial landmark point tracking. In facial landmark point tracking, a bounding box may be applied to the face and various features or landmarks of the face are determined and tracked. Landmarks are often a set of fiducial facial points, usually located on the corners, tips or mid points of the facial components such as the eyes, nose, lips and mouth. The landmarks may be determined by shape regression techniques such as Explicit Shape Regression (ESR) and Supervised Decent Method (SDM). Face frontalization comprises synthesizing frontal facing views of faces appearing in single unconstrained photos. During face frontalization, usually a 3D face model is adopted for registration and warping. Finally, illumination compensation enables dynamic emotion recognition in a variety of lighting conditions by compensating for and normalizing lighting conditions.

After data pre-processing, the gray-scale face image together with its corresponding basic Local Binary Patterns (LBP) and mean LBP feature maps are forwarded through the CNN as three-channel inputs. While particular feature maps have been described herein, any feature map can be used as input to the CNN 700.

The core layers block 704 incorporates three techniques for building lower, middle, and top layers of the CNN, resulting in a deep yet computationally efficient CNN. These techniques include a phase-convolution block 704A, phase-residual blocks 704B, and an inception-residual block 704C. The filters in the lower convolutional layers of the deep CNN 700 form pairs in phase. Thus, the filters of the lower convolutional layers contain considerable redundancy, and the number of filters can be reduced but the accuracy of the whole network is improved through modifying the activation scheme. To reduce redundant filters and enhance their non-saturated non-linearity in the lower convolutional layers, the phase-convolution block 704A is used for building lower layers of the CNN, such as a composite convolutional layer, denoted as conv_1 in FIG. 7.

The phase-residual blocks 704B are to employ a deep residual learning variant. The layers generated by the phase-residual blocks may learn residual functions with reference to the layer inputs, instead of learning unreferenced functions to create a residual network. The middle layers of the CNN 700 are built using this residual network, resulting in two composite convolutional layers, denoted as conv_2 and conv_3 in FIG. 7. The residual layers result in a considerably increased depth of the CNN while maintaining efficiency. Residual layers employ residual learning, wherein the layers are explicitly stacked to fit a residual mapping, instead of guessing that the layers will fit a desired underlying mapping. The convolutional layers of the phase residual blocks have mostly 3×3 filters and follow two simple design rules: (i) for the same output feature map size, the layers have the same number of filters; and (ii) if the feature map size is halved, the number of filters is doubled so as to preserve the time complexity per layer.

The inception-residual block 704C builds the top layers of the CNN 700, resulting in a composite convolutional layer, denoted as conv_4 in FIG. 7. The inception-residual block 704C broadens the network width and introduces multi-scale feature extraction property. The multi-scale feature extraction scheme results in a performance improvement in dynamic emotion recognition. Fully connected layers 706 may be used to abstract (1st fully connected layer) the features outputted by the layers block 704 and classify (2nd fully connected layer) abstracted features from 1st fully connected layer according to the output labels 708. The output labels 708 represent a plurality of human emotions. The output labels 708 include, but are not limited to basic human emotions such as, angry, disgust, fear, happy, neutral, sad, and surprise.

The present techniques can be applied at a speed of over 9000 frames per second on a GPU, resulting in real-time processing. Redundant filters are reduced and their non-saturated non-linearity in the lower convolutional layers are enhanced via phase-convolution block to build lower layers.

Accuracy is guaranteed by considerably increasing the depth of the CNN and maintaining efficiency via the phase-residual block to build the middle layers. The network width is also enhanced with multi-scale feature extraction via the inception-residual block used to build the topper layers of the CNN. In this manner, deep highly-semantic multi-scale features explicitly capturing emotion variation can be extracted from multi-path sibling layers and further concatenated for robust emotion recognition. The multi-scale feature map may comprise a plurality of features at different scales.

Figure 8:
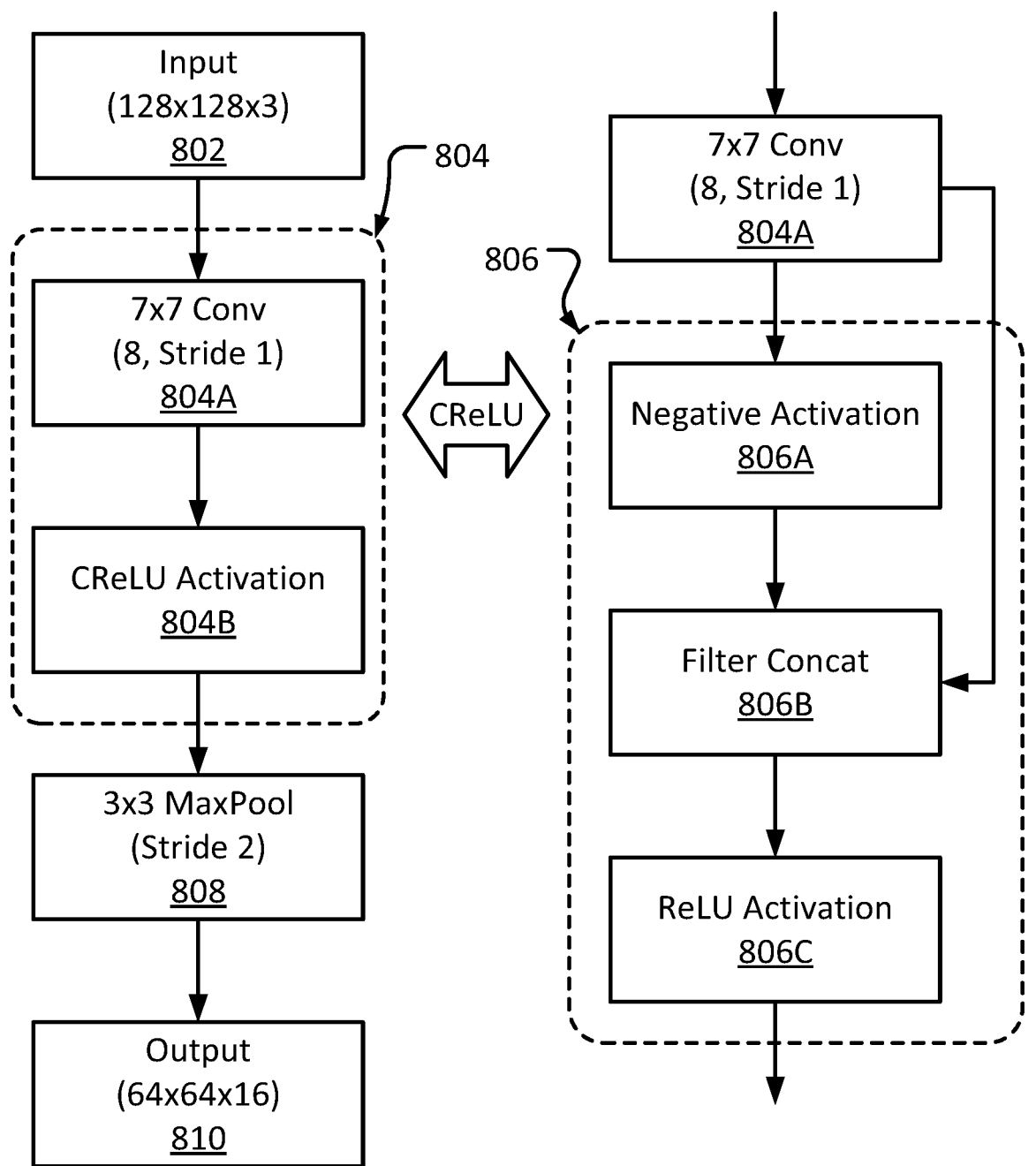
FIG. 8 illustrates an example phase-convolution block consistent with several embodiments described herein.

FIG. 8 illustrates an example phase-convolution block 800 consistent with several embodiments described herein. The phase-convolution block 800 further describes the phase-convolution block 704A of FIG. 7. Given three-channel image inputs at block 802, a CNN as described herein begins with a phase-convolution. The size of the three-channel image input is 128×128×3, where the height of the image is 128 pixels, the width of the image is 128 pixels, and 3 is the number of channels. At block 804, convolution is performed. In particular, at block 804A eight filters of size 7×7 with a stride of 1 are convolved with the image to produce 16 feature maps of size 128×128. At block 804B, a Concatenated Rectified Linear Unit (CReLU) is applied at block 804B instead of basic a ReLU. A basic Rectified Linear Unit (ReLU) retains the phase information but eliminates the modulus information when the phase of a response is negative. The CReLU is further described at block 806.

At block 806, an identical copy (this is identity mapping) of the linear responses after convolution is made. First at block 806A, the convolution results are negated during negative activation. In embodiments, negative activation includes multiplying the output Y by –1. A ReLU operation preserves only positive output while making negative output to zero. Therefore, in the present CReLU, after concatenation, both original negative and positive outputs are made to be positive, so they are activated/preserved.

At block 806B, filter concatenation occurs, and at block 806C the ReLU is applied. In this manner, both the positive and negative phase information is preserved while learnable hyper-parameters can be reduced by half. The CReLU enables a mathematical characterization of convolution layers in terms of a reconstruction property, and preserves all image information after convolution. Thus, the corresponding CNN features are expressive and generalizable. At block 808, each feature map is subsampled with max-pooling over 3×3 contiguous regions with a stride of 2. In embodiments, max-pooling is used to aggregate statistics of discovered features at various locations. In particular, after max pooling with a stride of 2, a block 810 feature maps of size 64×64×16 are output.

Figure 9:
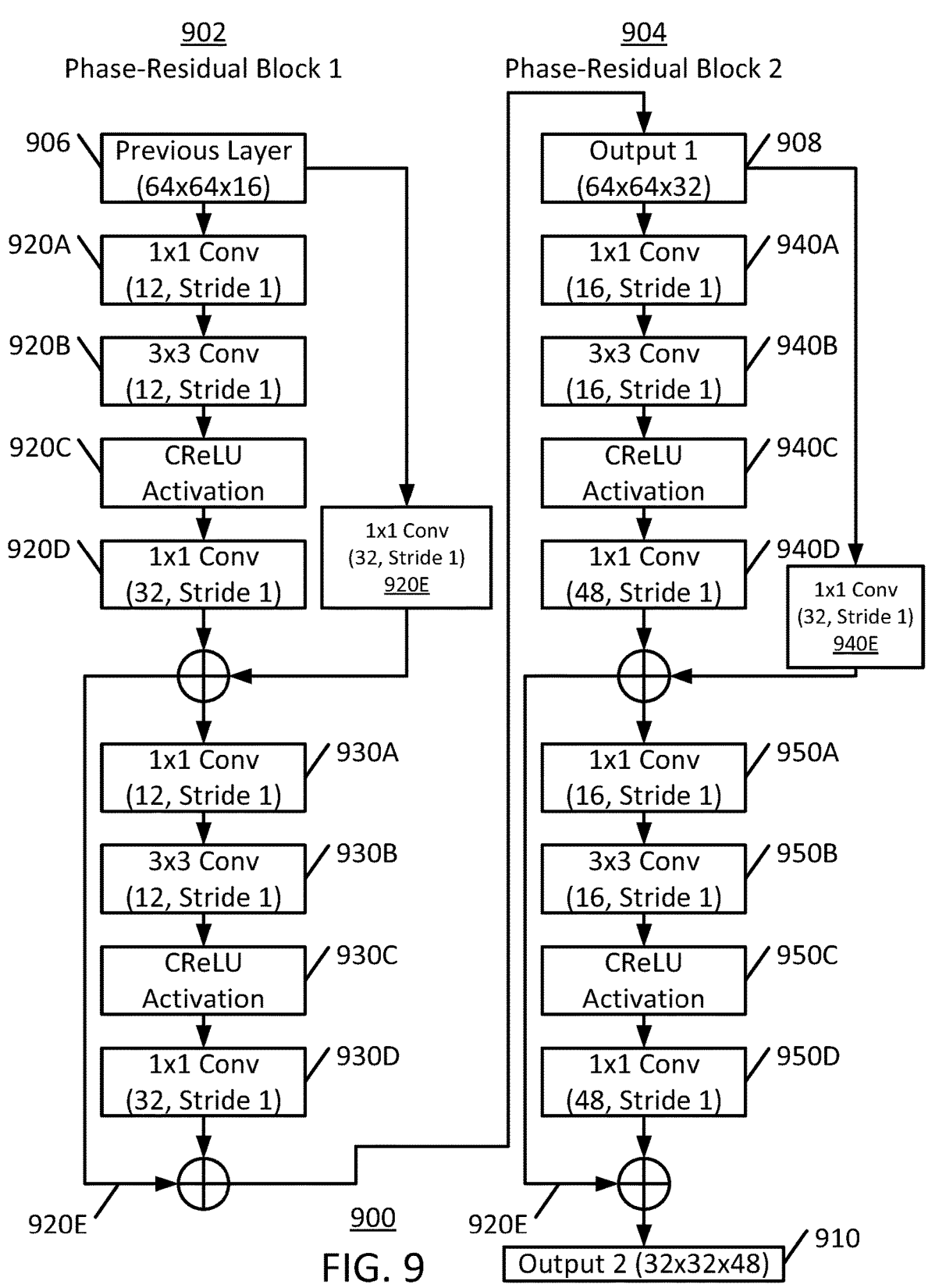
FIG. 9 illustrates example phase-residual blocks consistent with several embodiments described herein.

FIG. 9 illustrates example phase-residual blocks 900 consistent with several embodiments described herein. The phase-residual blocks 900 may be used to describe the phase-residual blocks 704B of FIG. 1. Following the conv_1 during the phase-convolution block 704A, there are two composite convolutional layers conv_2 and conv_3 during the phase-residual blocks 704B. They are defined as two phase-residual blocks 902 and 904 shown as the left and right parts of FIG. 9. In each phase-residual block 902 and 904, the CReLU and residual structure are combined into each of two sub-blocks. Each sub-block is composed of three convolutional layers (with 1×1, 3×3 and 1×1 kernels) with a stride of 1. Following the 3×3 convolutional layer, a CReLU operation, which compensates face feature and reduces redundancy. The last step in each sub-block such as 920E and 930D, 930D, 940E and 940D, and 950D, are residual operations.

In particular, at block 906, the feature maps from the phase-inception block 800 are obtained as input. At block 920A, a first convolutional layer convolves a 1×1 set of 12 kernels with the input from block 906. At block 920B, a second convolutional layer convolves a 3×3 set of 12 kernels with the input from block 920A. At block 920C, CReLU activation is performed on the output of block 920B. At block 920D, a third convolutional layer convolves a 1×1 set of 32 kernels with the input from block 920C. At block 920E, a convolutional layer convolves a 1×1 set of 32 kernels with the input from block 906. The output from block 920D and 920E (this is one residual operation using shortcut connection) are summed element-wise and input to block 930A, where a first convolutional layer convolves a 1×1 set of 12 kernels with the summed input from blocks 920D and 920E. At block 930B, a second convolutional layer convolves a 3×3 set of 12 kernels with the input from block 930A. At block 930C, CReLU activation is performed on the output of block 930B. At block 930D, a third convolutional layer convolves a 1×1 set of 32 kernels with the input from block 930C. The output of block 930D is summed element-wise with the output of blocks 920D and 920E, represented by block 930E (this is another residual operation using identity mapping), which results in 32 feature maps of size 64×64.

This output serves as an input at block 908 in the phase-residual block 2. Similar to the phase-residual block 902, at block 940A, a first convolutional layer convolves a 1×1 set of 16 kernels with the input from block 908. At block 940B, a second convolutional layer convolves a 3×3 set of 16 kernels with the input from block 940A. At block 940C, CReLU activation is performed on the output of block 940B. At block 940D, a third convolutional layer convolves a 1×1 set of 48 kernels with the input from block 940C. At block 940E, a convolutional layer convolves a 1×1 set of 48 kernels with the input from block 908. The output from block 940D and 940E are summed element-wise (this is one residual operation using shortcut connection) and input to block 950A, where a first convolutional layer convolves a 1×1 set of 16 kernel with the summed input from blocks 940D and 940E. At block 950B, a second convolutional layer convolves a 3×3 set of 16 kernel with the input from block 950A. At block 950C, CReLU activation is performed on the output of block 950B. At block 950D, a third convolutional layer convolves a 1×1 set of 48 kernel with the input from block 950C. The output of block 950D is summed element wise with the output of blocks 940D and 940E, represented by block 950E (this is another residual operation using identity mapping), which results in 48 feature maps of size 32×32.

Linear projection (i.e., a shortcut connection) is performed at the first sub-block in 902, while identity mapping is performed at the second sub-block in 904. In embodiments, identity mapping refers to directly copying the output, while the shortcut connection comprises applying a specific convolution over the output. Shortcut connections are those that skip one or more layers. Shortcut connections may perform identity mapping, and their outputs are added to the outputs of the stacked layer. Identity shortcut connections add neither extra parameters nor computational complexity.

The advantages of above defined phase-residual block 900 are twofold. First, the phase-residual block 900 enjoys fast training convergence. Second, the phase-residual block

900 enjoys the accuracy gain from considerably increased depth and maintained efficiency. In embodiments, phase-residual blocks contain many of sub-layers (i.e., convolutional layers), resulting in a much deeper network, especially compared with a phase-convolutional block.

Figure 10:
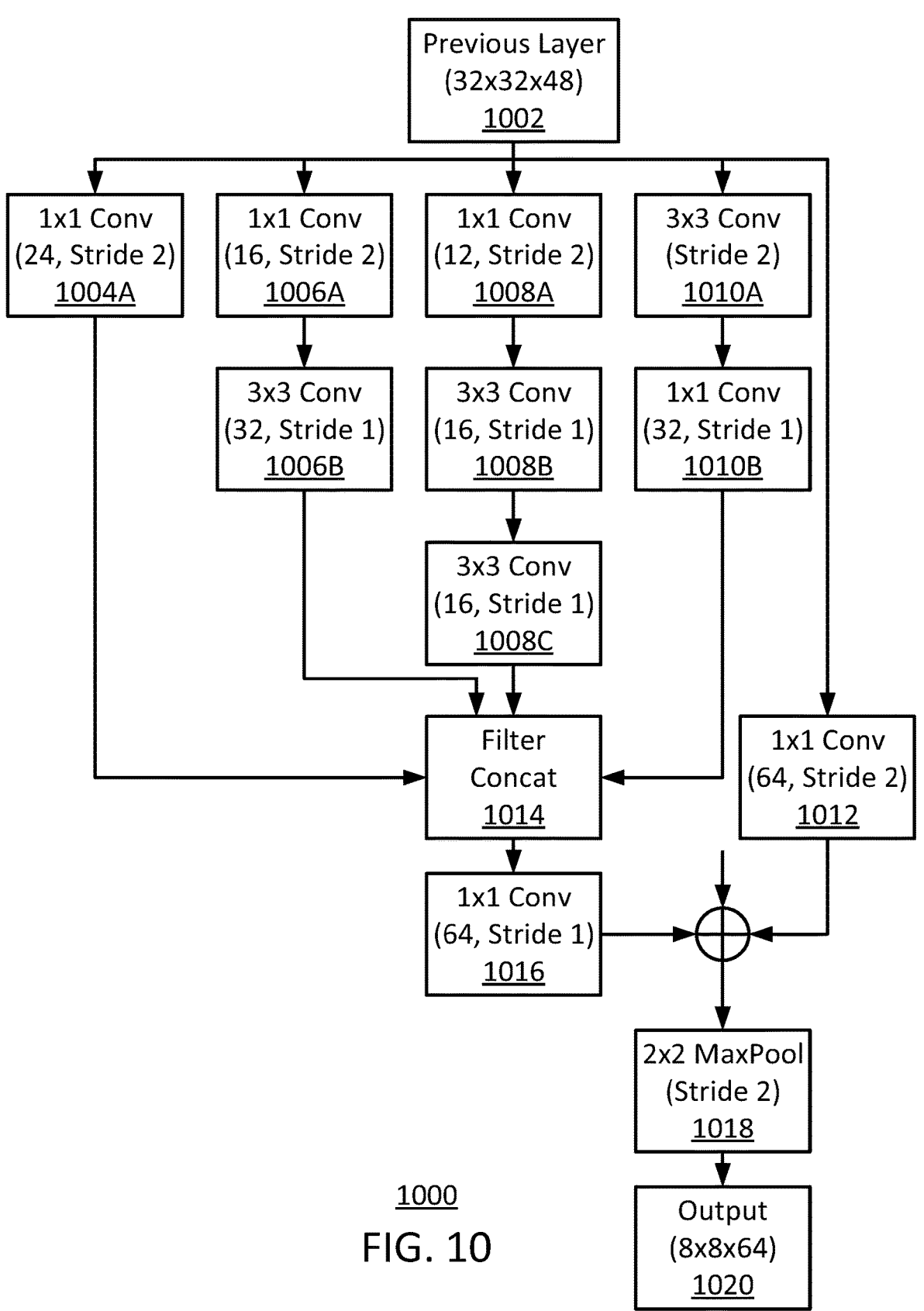
FIG. 10 illustrates an example inception-residual block consistent with several embodiments described herein.

FIG. 10 illustrates an example inception-residual block 1000 consistent with several embodiments described herein. At block 1002, the input to the inception-residual block 1000 is the output of the phase-residual block with 48 feature maps of size 32×32. The inception-residual block 1000 may be the inception-residual block 704C of FIG. 7. The inception-residual block 1000 begins with four sibling branches, each acting as a multi-scale feature extraction.

The most left sibling branch includes a block 1004A, where the input is convolved with a 1×1 set of 24 convolutional layers with stride of 2, akin to a 1×1 filter. The neighboring sibling branch has a 1×1 set of 16 convolutional layers with stride 2 at block 1006A and a 3×3 set of 32 convolutional layers at block 1006B, akin to a 3×3 filter. The next sibling branch has a 1×1 set of 12 convolutional layers with stride of 2 at block 1008A, a 3×3 set of 16 convolutional layers at block 1008B, and a 3×3 set of 16 convolutional layers at block 1008C, akin to a 3×3 filter. The final branch has a maxpool layer with stride of 2 at block 1010A, and a 1×1 set of 32 convolutional layers at block 1010B.

A multi-scale feature map is yielded by concatenating the feature maps from above four sibling branches at block 1014. In embodiments, the multi-scale feature map is the result of the four sibling layers acting as convolutions with different filter sizes in spatial, i.e., different reception fields for sibling layers. At block 1016, the concatenated feature maps are convolved by a 1×1 set of 64 convolutional layers and summed element wise (this is a residual operation with a shortcut connection) with a 1×1 set of 64 convolutional layers applied to the input data from block 1012. At block 1018, the summed layers are subsampled by a 2×2 max-pooling operation with a stride of 2. This results in an output of 64 8×8 feature maps at block 1020.

Empirical evidence shows that inception with residual connections accelerates the training significantly. One the other hand, high dimensional features extracted from multi-scale image patches can lead to high accuracy. The inception-residual block combines these two properties together with a residual structure. The advantages of above defined inception-residual block 1000 can extract more discriminative features at multiple scales, e.g., from micro to macro scale, thus bringing improved accuracy. Additionally, the inception-residual block 1000 results in fast training convergence, and also results in an accuracy gain from considerably increased depth of the network. Further, even with a deep network, efficiency is maintained.

Following the inception-residual block 704C, there are two fully connected layers fc5 706A and fc6 706B at block 706 in FIG. 7. Final feature abstraction is performed by fc5 706A whose output feature size is 7024, and fc6 706B is a classification layer with a softmax function outputting a plurality of human emotions, such as 7 basic human emotions including angry, disgust, fear, happy, neutral, sad, and surprise.

The HoloNet has fewer convolutional filters and thus a much lower computational cost with a similar depth when compared to other popular deep CNNs for computer vision tasks not just limited to dynamic emotion recognition in unconstrained scenarios. Generally, the CNN described herein includes 21-layers and 75 million floating point operations per second FLOPs. The FLOPs according to the present techniques are a small when compared to other deep CNNs. Thus, the present CNN model can be well run on any mobile platform with real-time processing requirement. A brief summary of FLOPs for the present CNN architecture model is given in Table 1.

| Layer Name | Output Size (before MaxPool) | FLOPs (million) |
|---|---|---|
| conv_1 | 128x128 | 19.27 |
| conv_2 | 64x64 | 22.22 |
| conv_3 | 32x32 | 10.85 |
| conv_4 | 16x16 | 5.86 |
| fc5 | 1024 | 16.79 |
| fc6 | 7 | 0.01 |
| Total | | 75.00 |

As described above, some or all of the CNNs as implemented in, for example, models 204A-204N may be Holo-Nets.

The network interface circuitry 406 may communicate with one or more remote systems using, for example, an Ethernet communications protocol. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard," published in March, 2002 and/or later versions of this standard, for example, the IEEE 802.3 Standard for Ethernet, published 2012; "IEEE Std 802.3bj™", published 2014, titled: IEEE Standard for Ethernet Amendment 2: Physical Layer Specifications and Management Parameters for 100 Gb/s Operation Over Backplanes and Copper Cables; IEEE P802.3by D0.1, titled: Draft Standard for Ethernet Amendment: Media Access Control Parameters, Physical Layers and Management Parameters for 25 Gb/s Operation; etc. In other embodiments, the network interface circuitry 406 may communicate with one or more remote systems using, for example, a custom and/or proprietary communications protocol.

The memory 404 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes at least one tangible computer-readable storage device having stored thereon, individually or in combination, instructions that when executed by one or more processors perform the methods. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage device suitable for storing electronic instructions.

In some embodiments, a hardware description language (HDL) may be used to specify circuit and/or logic implementation(s) for the various, logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

"Logic," as used herein, may comprise, singly or in any combination circuitry and/or code and/or instructions sets (e.g., software, firmware, etc.). "Circuitry," as used in any embodiment herein, may comprise, for example, singly or in any combination, hardwired circuitry, programmable circuitry, state machine circuitry, and/or firmware that stores instructions executed by programmable circuitry. The circuitry may be embodied as an integrated circuit, such as an integrated circuit chip.

The following examples pertain to further embodiments. The following examples of the present disclosure may comprise subject material such as an apparatus, a method, at least one machine-readable medium for storing instructions that when executed cause a machine to perform acts based on the method, means for performing acts based on the method and/or a system to integrate correlated cues from a multi-modal data set.

According to example 1, there is provided an apparatus capable of fusing features from a plurality of data modalities. The apparatus may comprise a processor, network interface circuitry to receive a sample dataset and a test dataset, training logic to determine one or more handcrafted features for each data modality based on the sample dataset, train a handcrafted model for each data modality based on the corresponding handcrafted features and the sample dataset, and train a plurality of deep learning model sets based on the sample dataset and the handcrafted models, the training including feed-forward training based on the sample dataset, determining error information, and updating parameters of the deep learning model sets based on the determined error information, and runtime prediction logic to predict a label based on the deep learning model sets, the handcrafted models, and the test dataset.

Example 2 may include the elements of example 1, wherein each of the plurality of deep learning model sets comprises one or more deep learning models, wherein each deep learning model is to produce a deep learning model output vector.

Example 3 may include the elements of example 2, wherein the deep learning models include at least one of convolutional neural networks (CNNs) or recurrent neural networks (RNNs).

Example 4 may include the elements of any of examples 2-3, wherein the feed-forward training includes submitting a subset of the sample data to each of the handcrafted models and each of the deep learning models, concatenating the deep learning model output vectors of the deep learning model set of each data modality into a concatenated modality vector, submitting each concatenated modality vector to an early abstraction layer for each data modality, wherein each early abstraction layer is to output an early abstraction layer output vector, concatenating the early abstraction layer output vectors and the handcrafted model output vectors into a late concatenated layer, and submitting the late concatenated layer to a late abstraction layer, the late abstraction layer to output a prediction vector.

Example 5 may include the elements of example 4, wherein the determining error information includes comparing the output prediction vector to a known value included in the sample dataset.

Example 6 may include the elements of any of examples 1-5, wherein, responsive to a determination that the error information is above a threshold, the training logic is further to train the deep learning model sets with an additional subset of the sample dataset, determine new error information for the additional subset of the sample dataset, and compare the new error information to the threshold.

Example 7 may include the elements of any of examples 1-6, wherein the runtime prediction logic to predict a label based on the deep learning model sets, the handcrafted models, and the test dataset comprises runtime prediction logic to submit a subset of the test data to each of the handcrafted models and each of the deep learning models, concatenate the deep learning model output vectors of the deep learning model set of each data modality into a concatenated modality vector, submit each concatenated modality vector to an early abstraction layer for each data modality, wherein each early abstraction layer is to output an early abstraction layer output vector, concatenate the early abstraction layer output vectors and the handcrafted model output vectors into a late concatenated layer, submit the late concatenated layer to a late abstraction layer, the late abstraction layer to output a prediction vector, and predict the label based on the prediction vector.

Example 8 may include the elements of any of examples 1-7, wherein the handcrafted models each comprise a support vector machine (SVM) model.

Example 9 may include the elements of any of examples 1-8, wherein the sample dataset comprises one or more video clips and the test dataset comprises one or more video clips.

Example 10 may include the elements of any of examples 1-9, wherein the plurality of data modalities comprise a video data modality and an audio data modality.

Example 11 may include the elements of example 10, wherein the handcrafted features corresponding to the video data modality comprise improved dense trajectory features.

Example 12 may include the elements of any of examples 10-11, wherein the handcrafted features corresponding to the audio data modality comprise mel-frequency cepstral coefficients (MFCC).

Example 13 may include the elements of any of examples 1-12, wherein the label comprises an emotion of a subject of the test dataset.

Example 14 may include the elements of example 13, wherein the emotion is selected from the list consisting of anger, sadness, disgust, happiness, surprise, fear, and a neutral emotion.

According to example 15, there is provided a method of fusing features from a plurality of data modalities. The method may comprise receiving, via network interface circuitry, a sample dataset, receiving, via the network interface circuitry, a test dataset, determining, via training logic, one or more handcrafted features for each data modality based on the sample dataset, training, via the training logic, a handcrafted model for each data modality based on the corresponding handcrafted features and the sample dataset, feed-forward training, via the training logic, a plurality of deep learning model sets based on the sample dataset and the handcrafted models, determining, via the training logic, error information, updating, via the training logic, parameters of the deep learning model sets based on the determined error information, and predicting, via runtime prediction logic, a label based on the deep learning model sets, the handcrafted models, and the test dataset.

Example 16 may include the elements of example 15, wherein each of the plurality of deep learning model sets comprises one or more deep learning models, wherein each deep learning model is to produce a deep learning model output vector.

Example 17 may include the elements of example 16, wherein the deep learning models include at least one of convolutional neural networks (CNNs) or recurrent neural networks (RNNs).

Example 18 may include the elements of any of examples 16-17, wherein the feed-forward training, via the training logic, a plurality of deep learning model sets based on the sample dataset and the handcrafted models includes submitting a subset of the sample data to each of the handcrafted models and each of the deep learning models, concatenating the deep learning model output vectors of the deep learning model set of each data modality into a concatenated modality vector, submitting each concatenated modality vector to an early abstraction layer for each data modality, wherein each early abstraction layer is to output an early abstraction layer output vector, concatenating the early abstraction layer output vectors and the handcrafted model output vectors into a late concatenated layer, and submitting the late concatenated layer to a late abstraction layer, the late abstraction layer to output a prediction vector.

Example 19 may include the elements of example 18, wherein the determining, via the training logic, error information includes comparing, via the training logic, the output prediction vector to a known value included in the sample dataset.

Example 20 may include the elements of any of examples 15-19, further comprising, responsive to a determination that the error information is above a threshold, training, via the training logic, the deep learning model sets with an additional subset of the sample dataset, determining, via the training logic, new error information for the additional subset of the sample dataset, and comparing, via the training logic, the new error information to the threshold.

Example 21 may include the elements of any of examples 15-20, wherein the predicting, via runtime prediction logic, a label based on the deep learning model sets, the handcrafted models, and the test dataset comprises concatenating, via the runtime prediction logic, the deep learning model output vectors of the deep learning model set of each data modality into a concatenated modality vector, submitting, via the runtime prediction logic, each concatenated modality vector to an early abstraction layer for each data modality, wherein each early abstraction layer is to output an early abstraction layer output vector, concatenating, via the runtime prediction logic, the early abstraction layer output vectors and the handcrafted model output vectors into a late concatenated layer, submitting, via the runtime prediction logic, the late concatenated layer to a late abstraction layer, the late abstraction layer to output a prediction vector, and predicting, via the runtime prediction logic, the label based on the prediction vector.

Example 22 may include the elements of any of examples 15-21, wherein the handcrafted models each comprise a support vector machine (SVM) model.

Example 23 may include the elements of any of examples 15-22, wherein the sample dataset comprises one or more video clips, and the test dataset comprises one or more video clips.

Example 24 may include the elements of any of examples 15-23, wherein the plurality of data modalities comprise a video data modality and an audio data modality.

Example 25 may include the elements of example 24, wherein the handcrafted features corresponding to the video data modality comprise improved dense trajectory (iDT) features.

Example 26 may include the elements of any of examples 24-25, wherein the handcrafted features corresponding to the audio data modality comprise mel-frequency cepstral coefficients (MFCC).

Example 27 may include the elements of any of examples 15-26, wherein the label comprises an emotion of a subject of the test dataset.

Example 28 may include the elements of example 27, wherein the emotion is selected from the list consisting of anger, sadness, disgust, happiness, surprise, fear, and a neutral emotion.

According to example 29 there is provided a system including at least one device, the system being arranged to perform the method of any of the above examples 15-28.

According to example 30 there is provided a chipset arranged to perform the method of any of the above examples 15-28.

According to example 31 there is provided at least one non-transitory computer readable storage device having stored thereon instructions that, when executed on a computing device, cause the computing device to carry out the method according to any of the above examples 15-28.

According to example 32 there is provided at least one apparatus configured for multi-modal feature fusion, the at least one apparatus being arranged to perform the method of any of the above examples 15-28.

According to example 33 there is provided a system for fusing features from a plurality of data modalities. The system may comprise means for receiving a sample dataset, means for receiving a test dataset, means for determining one or more handcrafted features for each data modality based on the sample dataset, means for training a handcrafted model for each data modality based on the corresponding handcrafted features and the sample dataset, means for feed-forward training a plurality of deep learning model sets based on the sample dataset and the handcrafted models, means for determining error information, means for updating parameters of the deep learning model sets based on the determined error information, and means for predicting a label based on the deep learning model sets, the handcrafted models, and the test dataset.

Example 34 may include the elements of example 33, wherein each of the plurality of deep learning model sets comprises one or more deep learning models, wherein each deep learning model is to produce a deep learning model output vector.

Example 35 may include the elements of example 34, wherein the deep learning models include at least one of convolutional neural networks (CNNs) or recurrent neural networks (RNNs).

Example 36 may include the elements of any of examples 34-35, wherein the means for feed-forward training a plurality of deep learning model sets based on the sample dataset and the handcrafted models includes means for submitting a subset of the sample data to each of the handcrafted models and each of the deep learning models, means for concatenating the deep learning model output vectors of the deep learning model set of each data modality into a concatenated modality vector, means for submitting each concatenated modality vector to an early abstraction layer for each data modality, wherein each early abstraction layer is to output an early abstraction layer output vector, means for concatenating the early abstraction layer output vectors and the handcrafted model output vectors into a late concatenated layer, and means for submitting the late concatenated layer to a late abstraction layer, the late abstraction layer to output a prediction vector.

Example 37 may include the elements of example 36, wherein the means for determining error information comprise means for comparing the output prediction vector to a known value included in the sample dataset.

Example 38 may include the elements of any of examples 33-37, further comprising means for training the deep learning model sets with an additional subset of the sample dataset, means for determining new error information for the additional subset of the sample dataset, and means for comparing the new error information to a threshold.

Example 39 may include the elements of any of examples 33-38, wherein the means for predicting a label based on the deep learning model sets, the handcrafted models, and the test dataset comprises means for concatenating the deep learning model output vectors of the deep learning model set of each data modality into a concatenated modality vector, means for submitting each concatenated modality vector to an early abstraction layer for each data modality, wherein each early abstraction layer is to output an early abstraction layer output vector, means for concatenating the early abstraction layer output vectors and the handcrafted model output vectors into a late concatenated layer, means for submitting the late concatenated layer to a late abstraction layer, the late abstraction layer to output a prediction vector, and means for predicting the label based on the prediction vector.

Example 40 may include the elements of any of examples 33-39, wherein the handcrafted models each comprise a support vector machine (SVM) model.

Example 41 may include the elements of any of examples 33-40, wherein the sample dataset comprises one or more video clips, and the test dataset comprises one or more video clips.

Example 42 may include the elements of any of examples 33-41, wherein the plurality of data modalities comprise a video data modality and an audio data modality.

Example 43 may include the elements of example 42, wherein the handcrafted features corresponding to the video data modality comprise improved dense trajectory (iDT) features.

Example 44 may include the elements of any of examples 42-43, wherein the handcrafted features corresponding to the audio data modality comprise mel-frequency cepstral coefficients (MFCC).

Example 45 may include the elements of any of examples 33-44, wherein the label comprises an emotion of a subject of the test dataset.

Example 46 may include the elements of example 45, wherein the emotion is selected from the list consisting of anger, sadness, disgust, happiness, surprise, fear, and a neutral emotion.

What is claimed is:

1. A device for fusing features from a plurality of data modalities, comprising:
    a processor;
    network interface circuitry to receive:
        a sample dataset; and
        a test dataset;
    training logic to, for each data modality of a plurality of data modalities:

determine one or more features for the data modality based on the sample dataset;
        train a first pre-trained model for the data modality based on the determined or more features and the sample dataset to produce a first pre-trained model output vector;
        train a first deep learning model for the data modality based on the sample dataset and one or more parameters of the first deep learning model to produce a deep learning model output vector, wherein the first deep learning model includes an inception-residual block to perform multi-scale feature map generation based on concatenation of feature maps;
        concatenate the deep learning model output vector and a second deep learning model output vector into a concatenated modality vector;
        submit the concatenated modality vector to a first abstraction layer, wherein the first abstraction layer is to output a first abstraction layer output vector;
        concatenate the first abstraction layer output vector and the first pre-trained model output vector into a second concatenated layer;
        submit the second concatenated layer to a second abstraction layer, the second abstraction layer to generate an output;
        compare an error of the output with a threshold; and
        update the one or more parameters of the first deep learning model in response to the error of the output being above the threshold; and
    runtime prediction logic to:
        partition audiovisual data received by a computer vision system into video frames and an audio signal;
        input the video frames into the first deep learning model and the audio signal into the first pre-trained model; and
        perform a computer vision-based emotion recognition task associated with the audiovisual data based on the first deep learning model, the first pre-trained model, and the test dataset.

2. The device of claim 1, wherein the first deep learning model comprises one or more deep learning models, wherein the first deep learning model is to produce a deep learning model output vector.

3. The device of claim 2, wherein the deep learning models include at least one of:
    convolutional neural networks (CNNs); or
    recurrent neural networks (RNNs).

4. The device of claim 1, further includes comparing the output of the second abstraction layer which includes a prediction vector to a known value included in the sample dataset.

5. The device of claim 4, wherein, responsive to a comparison that the error of the output is above a threshold, the training logic is further to:
    train the first deep learning model with an additional subset of the sample dataset;
    determine new error information for the additional subset of the sample dataset; and
    compare the new error information to the threshold.

6. The device of claim 4, further includes a runtime prediction logic to predict a label of an emotion based on the prediction vector.

7. The device of claim 1, wherein:
    the sample dataset comprises one or more video clips;
    the test dataset comprises one or more video clips; and
    the plurality of data modalities comprise:

a video data modality; and an audio data modality.

8. The device of claim 6, wherein the label comprises an emotion of a subject of the test dataset, the emotion selected from a list consisting of:

anger;

sadness;

disgust;

happiness;

surprise;

fear; and a neutral emotion.

9. A method of fusing features from a plurality of data modalities, comprising:

for each data modality of the plurality of data modalities:

determining one or more features for the data modality based on a sample dataset;

training a first pre-trained model for the data modality based on the determined or more features and the sample dataset to produce a first pre-trained model output vector;

training a first deep learning model for the data modality based on the sample dataset and one or more parameters of the first deep learning model to produce a deep learning model output vector, wherein the first deep learning model includes an inception-residual block to perform multi-scale feature map generation based on concatenation of feature maps;

concatenating the deep learning model output vector and a second deep learning model output vector into a concatenated modality vector;

submitting the concatenated modality vector to a first abstraction layer, wherein the first abstraction layer is to output a first abstraction layer output vector;

concatenating the first abstraction layer output vector and the first pre-trained model output vector into a second concatenated layer;

submitting the second concatenated layer to a second abstraction layer, the second abstraction layer to generate an output;

comparing an error of the output with a threshold;

updating the one or more parameters of the first deep learning model in response to the error of the output being above the threshold;

partitioning audiovisual data received by a computer vision system into video frames and an audio signal;

inputting the video frames into the first deep learning model and the audio signal into the first pre-trained model; and performing a computer vision-based emotion recognition task associated with the audiovisual data based on the first deep learning model, the first pre-trained model, and a test dataset.

10. The method of claim 9, wherein the first deep learning model comprises one or more deep learning models, wherein the first deep learning model is to produce a deep learning model output vector.

11. The method of claim 10, wherein the deep learning models include at least one of:

convolutional neural networks (CNNs); or recurrent neural networks (RNNs).

12. The method of claim 9, further includes comparing the output of the second abstraction layer which includes a prediction vector to a known value included in the sample dataset.

13. The method of claim 12, further comprising, in response to the error being above a threshold:

training the first deep learning model with an additional subset of the sample dataset;

determining new error information for the additional subset of the sample dataset; and comparing the new error information to the threshold.

14. The method of claim 12, wherein the computer vision-based emotion recognition task includes predicting a label of an emotion in a video based on the prediction vector.

15. The method of claim 9, wherein:

the sample dataset comprises one or more video clips;

the test dataset comprises one or more video clips; and the plurality of data modalities comprise:

a video data modality; and an audio data modality.

16. A non-transitory machine readable storage medium comprising instructions to cause programmable circuitry to at least:

for each data modality of a plurality of data modalities:

determine one or more features for the data modality based on a sample dataset;

train a first pre-trained model for the data modality based on the determined or more features and the sample dataset to produce a first pre-trained model output vector;

train a first deep learning model for the data modality based on the sample dataset and one or more parameters of the first deep learning model to produce a deep learning model output vector, wherein the first deep learning model includes an inception-residual block to perform multi-scale feature map generation based on concatenation of feature maps;

concatenate the deep learning model output vector and a second deep learning model output vector into a concatenated modality vector;

submit the concatenated modality vector to a first abstraction layer, wherein the first abstraction layer is to output a first abstraction layer output vector;

concatenate the first abstraction layer output vector and the first pre-trained model output vector into a second concatenated layer;

submit the second concatenated layer to a second abstraction layer, the second abstraction layer to generate an output;

compare an error of the output with a threshold;

update the one or more parameters of the first deep learning model in response to the error of the output being above the threshold;

partition audiovisual data received by a computer vision system into video frames and an audio signal;

input the video frames into the first deep learning model and the audio signal into the first pre-trained model; and perform a computer vision-based emotion recognition task associated with the audiovisual data based on the first deep learning model, the first pre-trained model, and a test dataset.

17. The non-transitory machine readable storage medium of claim 16, wherein the first deep learning model comprises one or more deep learning models, wherein the first deep learning model is to produce a deep learning model output vector.

18. The non-transitory machine readable storage medium of claim 17, wherein the deep learning models include at least one of:

convolutional neural networks (CNNs); or recurrent neural networks (RNNs).

19. The non-transitory machine readable storage medium of claim 16, wherein the programmable circuitry is to compare output of the second abstraction layer which includes a prediction vector to a known value included in the sample dataset.

20. The non-transitory machine readable storage medium of claim 19, wherein the programmable circuitry is to:

train the first deep learning model with an additional subset of the sample dataset;

determine new error information for the additional subset of the sample dataset; and compare the new error information to a threshold.

21. The device of claim 1, wherein the first deep learning model is a convolutional neural network (CNN) including a phase-residual block and the inception-residual block.

22. The device of claim 21, the inception-residual block including four branches to perform the multi-scale feature map generation based on concatenation of feature maps from each of the four branches.

23. The device of claim 21, wherein the CNN includes a phase-convolution block to enhance non-saturated non-linearity in lower convolutional layers.

24. The device of claim 1, wherein the first pre-trained model includes a support vector machine (SVM) model trained on improved Dense Trajectory (iDT) features of video data associated with the video frames.

\* \* \* \* \*